United States Patent [19]
Platteter et al.

[11] Patent Number: 5,629,775
[45] Date of Patent: May 13, 1997

[54] SYSTEM ARCHITECTURE FOR ATTACHING AND CONTROLLING MULTIPLE FEEDING AND FINISHING DEVICES TO A REPRODUCTION MACHINE

[75] Inventors: Dale T. Platteter, Jacksonville, Fla.; Jeff C. Carter, Fairport, N.Y.

[73] Assignee: Xerox Corporation, Stamford, Conn.

[21] Appl. No.: 280,978

[22] Filed: Jul. 27, 1994

[51] Int. Cl.⁶ .............................. H04N 1/00; H04N 1/32; G03G 21/00
[52] U.S. Cl. ........................ 358/296; 358/401; 358/468; 399/43; 399/407
[58] Field of Search .......................... 358/296, 300, 358/401, 406, 468, 498; 355/202–207, 321–325, 208

[56] References Cited

U.S. PATENT DOCUMENTS 5,363,175  11/1994  Matysek ..................... 355/208
5,422,705   6/1995  Omelchenko et al. ........ 355/208

*Primary Examiner*—Eric Frahm
*Attorney, Agent, or Firm*—Ronald F. Chapuran

[57] ABSTRACT

An electronic image processing apparatus having a marking machine, a source of copy sheets, a controller, and a plurality of resources wherein each of the resources includes an associated processor for storing data related to the operational timing of the associated resource. A bus interconnects the processors to the controller for directing the operation of the image processing apparatus to provide images on the copy sheets and the controller includes circuitry for interrogating each of the processors for the operational timing data and logic for responding to the operational timing data of each of the processors for dynamically configuring the controller to operate in accordance with the operational timing of the processors.

15 Claims, 7 Drawing Sheets

SYSTEM ARCHITECTURE FOR ATTACHING AND CONTROLLING MULTIPLE FEEDING AND FINISHING DEVICES TO A REPRODUCTION MACHINE

BACKGROUND OF THE INVENTION

The invention relates to a system architecture, and in particular, to a system architecture for attaching and controlling multiple feeding and finishing devices in a reproduction machine.

In the early days of copiers, copies were fed to a tray where the operator took them and performed manual finishing operations. These manual operations ranged from simple collation and stapling to more sophisticated operations such as folding and inserting in an envelope for mailing. Later products incorporated finishing functionality within the print engine to relieve the operator of these manual finishing functions. Finishing operations included collation, stapling and in more recent products, binding. The same revolution has also occurred in feeding applications. Operators originally placed the document to be copied on the platen, closed the cover and pushed the start print button. Now, automatic document feeders and recirculating document handlers have become commonplace.

There has been an evolution of incorporating additional feeding and finishing functions within the print engine. However, the functions provided have often fallen short of the need of many customers. For example, in central reproduction environments there is a great amount of effort put into finishing the documents that are printed. To date the majority of these have been in the form of off-line finishing devices. Customers typically produce copies on a print engine, stack them on a skid, then take them over to an off-line or chain of off-line finishing devices to complete the final product. There are also environments which have other specific finishing applications, for example, a centralized printer attached to a network which is used by many individuals. In one scenario, everyone sends their output to the printer. An individual walking up to the printer must sort through the jobs currently sitting in the output tray and place them in alphabetically categorized bins. This is a manual operation and is subject to human error such as jobs being put in the incorrect bin.

One answer to the above problems has been to incorporate the feeding and finishing operations into the print engine. This was well received early on when the collation and stapling were the majority of feeding and finishing operations. Customers, however, are requiring more and more sophisticated feeding and finishing operations. It is increasingly becoming inefficient to follow a course of developing feeding and finishing functions specific to a single product. This is a very time consuming activity, requires enormous resources and also leads to duplication of activities. As an example, there are many products offered that provide the option of stapling. Many of these products have different stapling operations. It would be desirable to avoid the large duplication of effort required.

Another issue is the large number of third party vendors which have a great deal of experience in the feeding and finishing technologies. It is a waste of resources to duplicate the off-line feeding and finishing functions currently provided by third party vendors. It would be desirable, therefore, to develop a standard for attaching feeding and finishing devices to print engines This standard would be used both internally for developing new products and externally by third party vendors for providing the wide range of feeding and finishing functions to our customers.

It is an object of the present invention, therefore, to avoid the duplication of efforts for developing feeding and finishing capabilities and to allow third party vendors to develop or adapt feeding and finishing devices to standard print engines. It is another object of the present invention to be able to organize the document feeding and/or finishing accessories in the sequence that meets the needs for a fully automated job and to be able to attach finishing or feeder devices in any order that the operator decides is appropriate for the application.

Other advantages of the present invention will become apparent as the following description proceeds, and the features characterizing the invention will be pointed out with particularity in the claims annexed to and forming a part of this specification.

SUMMARY OF THE INVENTION

An electronic image processing apparatus having a marking machine, a source of copy sheets, a controller, and a plurality of resources wherein each of the resources includes an associated processor for storing data related to the operational timing of the associated resource. A bus interconnects the processors to the controller for directing the operation of the image processing apparatus to provide images on the copy sheets and the controller includes circuitry for interrogating each of the processors for the operational timing data and logic for responding to the operational timing data of each of the processors for dynamically configuring the controller to operate in accordance with the operational timing of the processors.

For a better understanding of the present invention, reference may be had to the accompanying drawings wherein the same reference numerals have been applied to like parts and wherein:

DETAILED DESCRIPTION OF THE DRAWINGS

Figure 11:
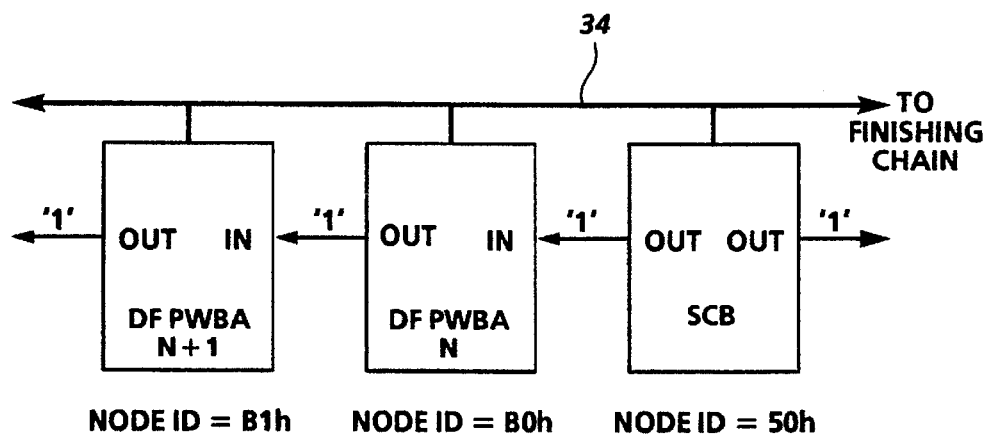
Figure 12:
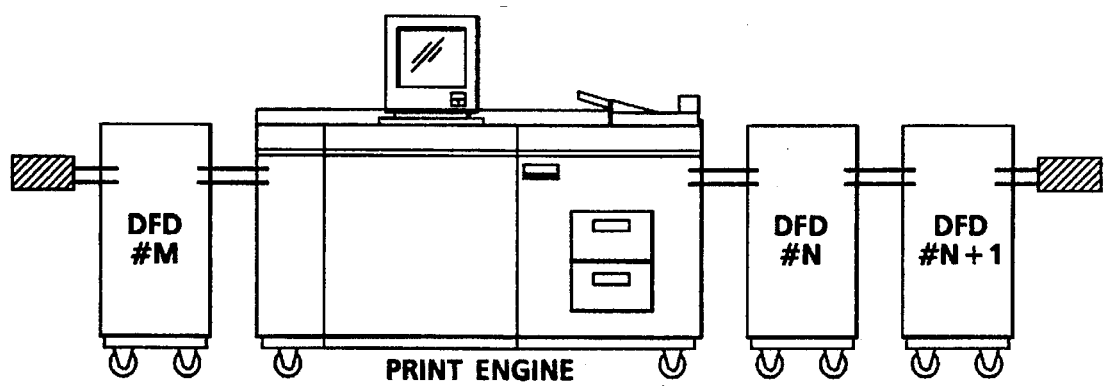

FIGS. 7, 8, 9, and 10 illustrate the automatic determination of characteristics of diverse interconnected finishing devices in accordance with the present invention;

FIG. 11 illustrates the automatic determination of characteristics of diverse feeding devices in accordance with the present invention; and FIG. 12 illustrates a control termination technique for interconnected devices in accordance with the present invention.

DETAILED DESCRIPTION OF THE PREFERRED EMBODIMENT

Figure 1:
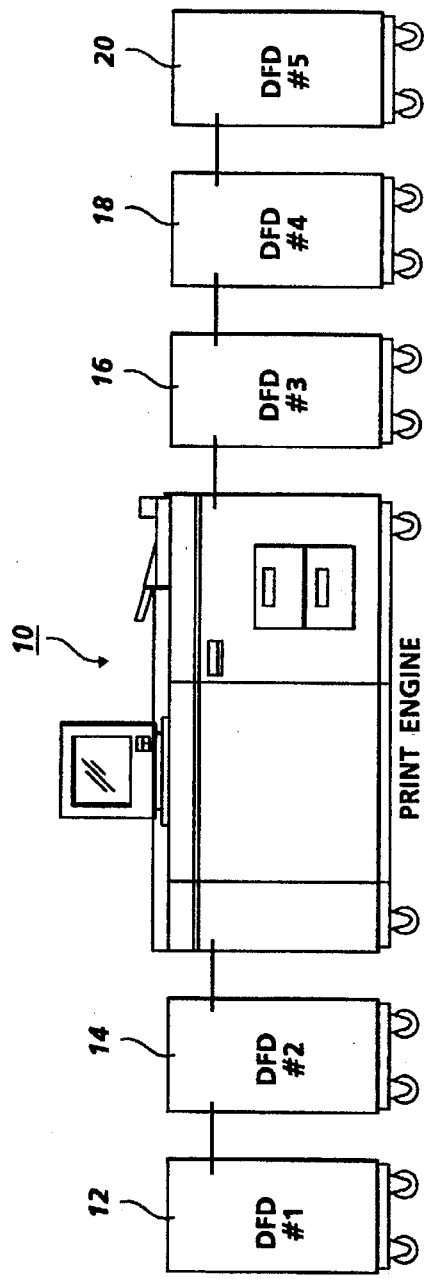
FIG. 1 is a block diagram depicting the physical layout of a system incorporating the present invention.

Referring to FIGS. 1, there is shown a standard interface provided by a printer to attach feeding and/or finishing devices. In particular, marking engine or printer 10 including a user interface with screen 11 is interconnected to document feeding devices 12 and 14 and document finishing devices 16, 18, and 20. As is well known, the feeding devices are sources of printable media like paper for providing printer 10 with stock for completion of the printing process. The finishing devices can be any suitable devices such as sorters, compilers, staplers, folders, or trimmers. It should be noted that FIG. 1 is only one embodiment and meant to illustrate a functional view of the devices rather than actual physical placement. Feeding devices are paper trays, and the need for feeding devices is to supply an increased level of printable stock selection to the printer. This could be for the purpose of having multiple colors of tabs or separater stock or front and rear cover stock with a clear coversheet. Or it could be a check printing application where there is a variety of scenes pre-printed and each is fed in a collated order to build a check book with the proper cover sheets and rear cover stock.

The feeding/finishing devices are physically attached to the print engine such that sheets can be feed into the print engine or sheet or sets can be transferred from the print engine to the devices. The devices are attached to each other such that sheets or sets of paper can be transferred from one device to another. It should be understood that the mechanical specifications of how these devices are connected to the print engine or to one another are not part of the present invention.

Figure 2:
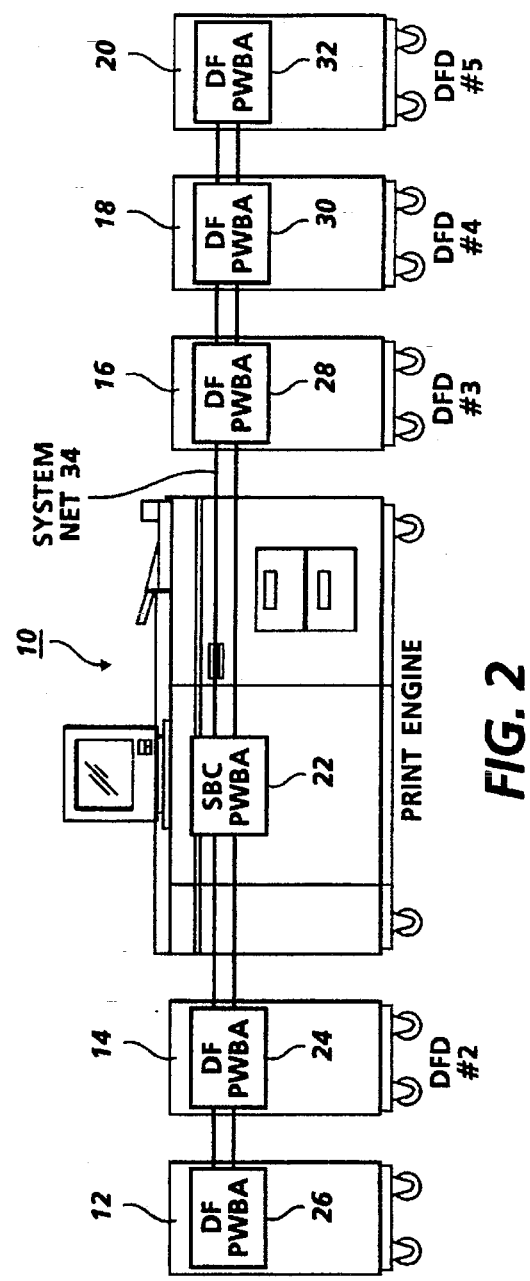
FIG. 2 illustrates the electrical interconnection of the devices of the system of FIG. 1.

FIG. 2 illustrates the electrical interconnection between the print engine and a chain of devices. It should be noted that there can be multiple feeding devices and multiple finishing devices. In particular, printed wiring board assembly (PWBA) 26 of feeding device 12 is connected to PWBA 24 of feeding device 14, in turn connected to PWBA 22 of the print engine 10. PWBA 22 is also known as the serial bus controller (SBC). In a similar manner, PWBA 22 is connected to PWBA 28 of finisher device 28 connected tomP-WBA 30 of finisher device 18, in turn conneceted to PWBA 32 of finisher device 20.

Figure 3:
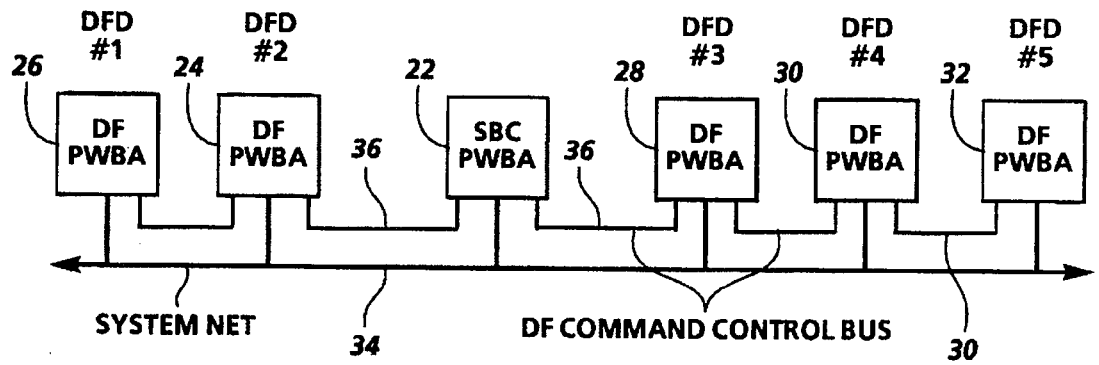
FIG. 3 illustrates a document feeder and finisher network interconnection in accordance with the present invention.

The interconnections of the electrical hardware shown in FIG. 2 include a serial interface link 34 and a command control bus 36 as best seen in FIG. 3. The serial interface link 34 is part of a network called the System Net and is responsible for communications between the Serial Bus Controller, SBC, located in the print engine and the printed wiring boards (PWBA) located in the feeding and finishing devices. The System Net is a high speed communications network operating at 10 MHZ and in one embodiment provides the capability to address from one (1) to 32 independent feeding and/or finishing devices. The Command Control Bus communicates between the PWBA's and the SCB to enable autoconfiguration as will be discussed.

Each finisher or feed device contains the intelligence to control its own operation. It also contains the timing and functionality specifications that are specific to the particular device. The removal of a device control from the print engine control enables the integration of most any device to the print engine without having to rewrite the print engine control software. The device PWBA provides two functions, One is to provide an interface to the total system via the System Net and the other function is that of local control of the device. The device PWBA contains all the software needed to integrate the document feeding or finishing device into the chain of feeding and finishing devices controlled by the print engine. The communications portion of the software on the device PWBA is common on every PWBA in each of the devices. In addition there is software on the board that is used to control the specific feeding or finishing device.

Figure 4:
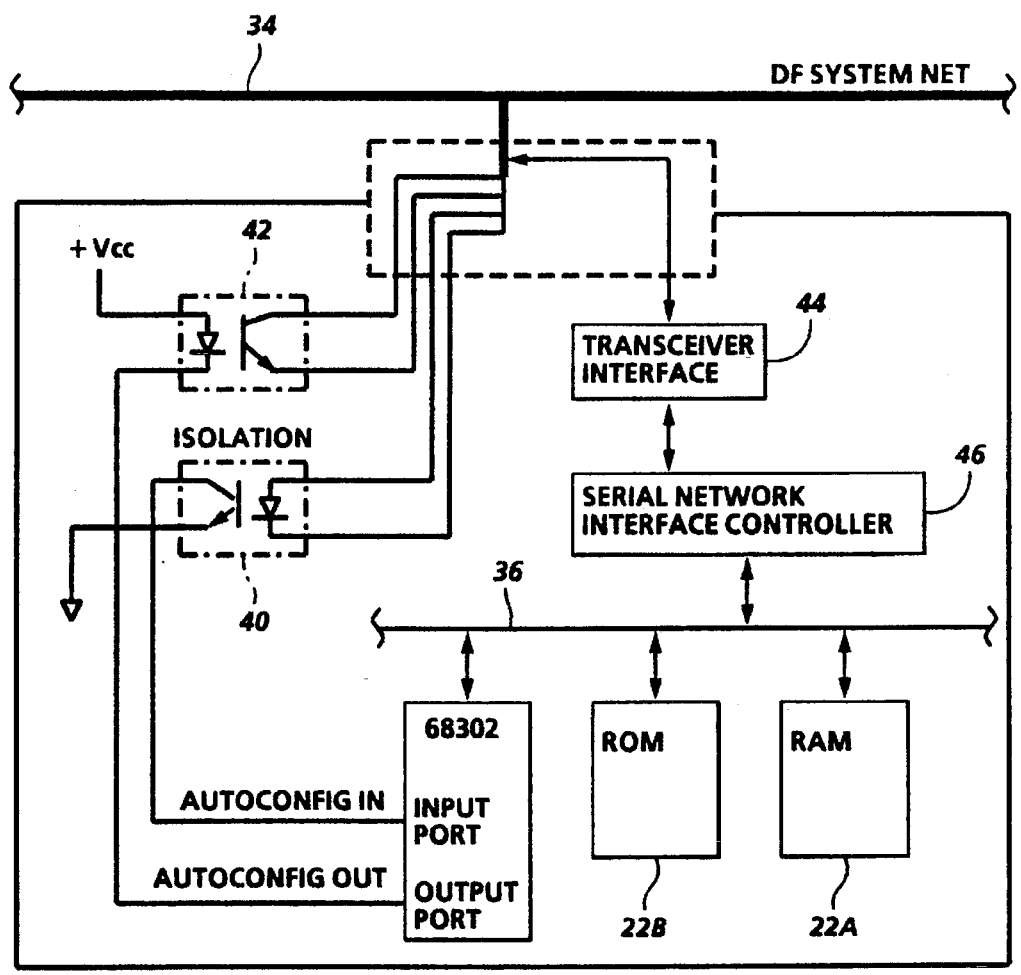
FIG. 4 illustrates optical isolation of the devices of FIG. 2.

In particular, the SBC PWBA 22 includes memory 22A in FIG. 4 storing data related to the operation and timing of the associated feeder or finsiher and logic and circuitry 22B (either hardware or software in ROM) for interrogating each of the device PWBA's for the operational and timing data of the device PWBA. In addition, the logic and circuitry 22B responds to the operational and timing data of each of the device PWBA's for dynamically configuring the SBC 22 PWBA to operate in accordance with the operation and timing data of each device PWBA. In addition, each device PWBA (such as PWBA 24 and PWBA 28) includes memory 24A and 28A storing data related to the operation and timing of the related feeder or finsiher device 24 or 28 and logic and circuitry 24B and 28B for responding to the interrogation from SCB22 for the operational and timing data of the associated device such as feeder 24 or finisher 28.

The logic and circuitry 22B, after interrogating each device PWBA in the manner to be described, determines the compatibility of the interconnected devices and establishes a timing relationship that is suitable for the overall operation of printer 10. This includes timing adjustments such as altering the pitch or cycles of the attached device. For example, the logic and circuitry 24B and 28B adjust to new timing information from SCB 22 to skip pitches or change timing cycles to maintain timing compatibility with the printer 10 and with one another. Screen 11 interconnected to SCB 22 displays in any suitable format, code, or message the timing and timing relationships of each device for operating and diagnosing printer operation.

The alteration of the printers pitch or print cycle is necessary to provide the printer with the ability to limit its print speed in order that it does not over run the finishing devices. The thruput of the system is set by the slowest device. In order to match speed, pitches are skipped as required to match the overall finishing device speed since the print engine speed is not actually variable. Skipping print engine pitches needs to be predetermined to assure the proper sequence of events to produce a copy. Dynamic feedback from the finishing devices to the SBC is needed to properly set up the print engine.

The Command Control Bus 36 consists of six wires, three signal lines and three corresponding return lines in a twisted pair configuration. One of the three signal wire pairs is the autoconfiguration enable line. Autoconfiguration means that a device can be inserted into a document feeding or finishing chain and the print engine can determine the capabilities of that device and its position within the chain with no operator intervention as will be explained later. The device will treat the input end of the autoconfiguration signal as an input to the device. This signal will be used to convey control information to the device. Each device will be required to assert a given level signal for use by the next device in the chain for the output of the autoconfiguration signal from the device.

The second signal wire pair on the Command Control Bus 36 is the Synch Signal. This signal will be used to synchronize all of the devices together with the printer. Preferrably, it will be based upon the page synch or pitch reset signal. The device will monitor this signal for control as specified in the high level software control specification but must pass this signal in its unmodified form to the next device in the chain.

The third signal wire pair is reserved for hard stop. Finisher or feeding devices must provide a one to one interconnect from the input of the Command Control Bus signals from where the signals enter the device and where they exit the device. With reference to FIG. 4, for a typical device PWBA, the command Control Bus 36 is optically isolated between the devices and the print engine by an input optical isolator 40 and an output optical isolator 42 shown here for the auto configuration signals. Included, also, are a switchable transceiver interface 44 with the systems net 34 to bus 36 through interface controller 46.

Figure 5:
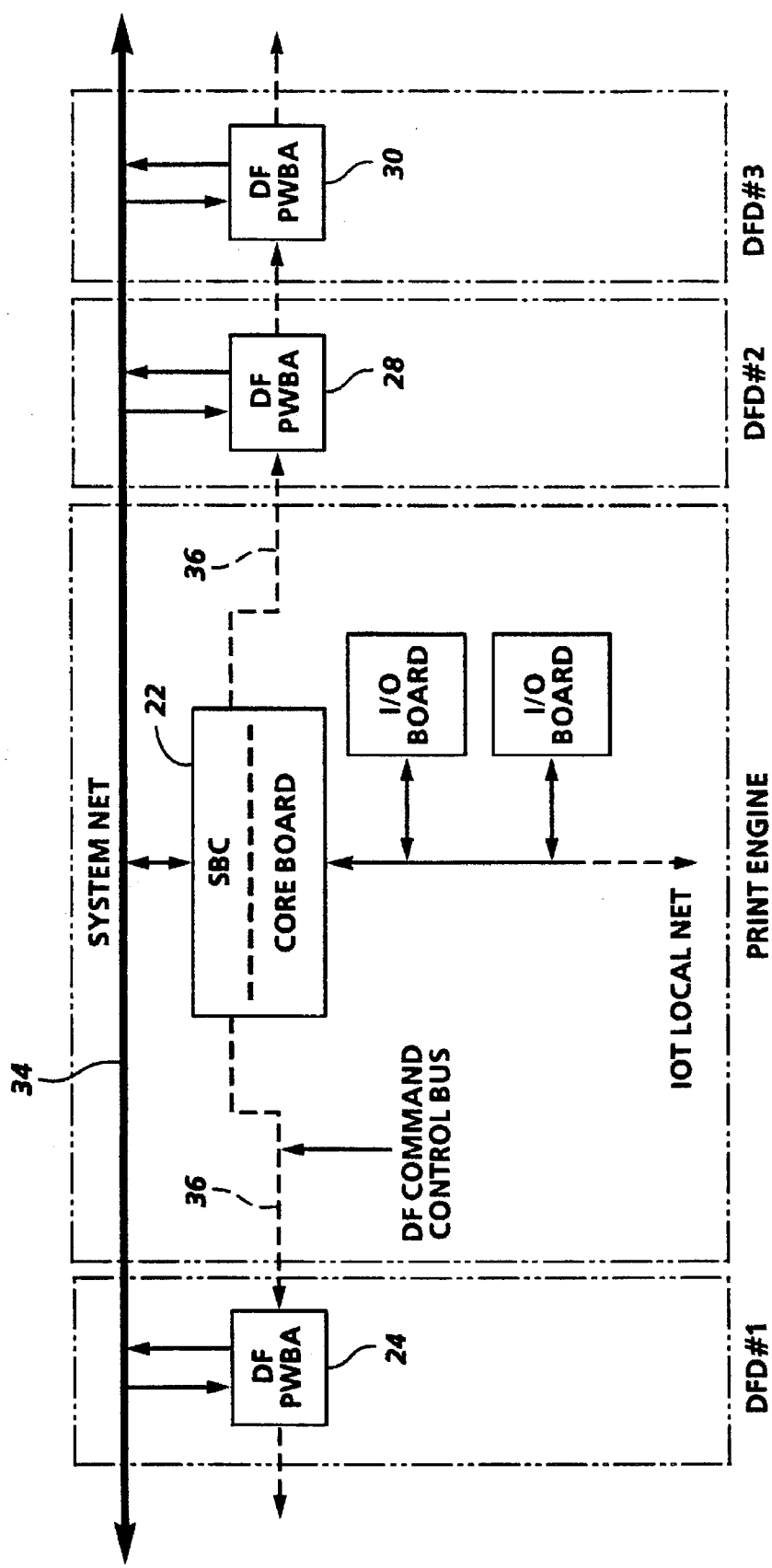
FIG. 5 illustrates one embodiment of a control architecture in accordance with the present invention.

In one embodiment, separate feeder devices are chained together in order to provide system functionality at the preference of the operator. The devices are electrically connected via the network (the document feeder System Net 34 and Command Control Bus 36. Internal to each device is a PWBA and FIG. 5 illustrates the interconnection with the SCB 22 connected to the PWBA's through the network. Note that the individual components of the network (the System Net and the Command Control Bus) are shown separately for clarity, but will reside in one harness.

Figure 6:
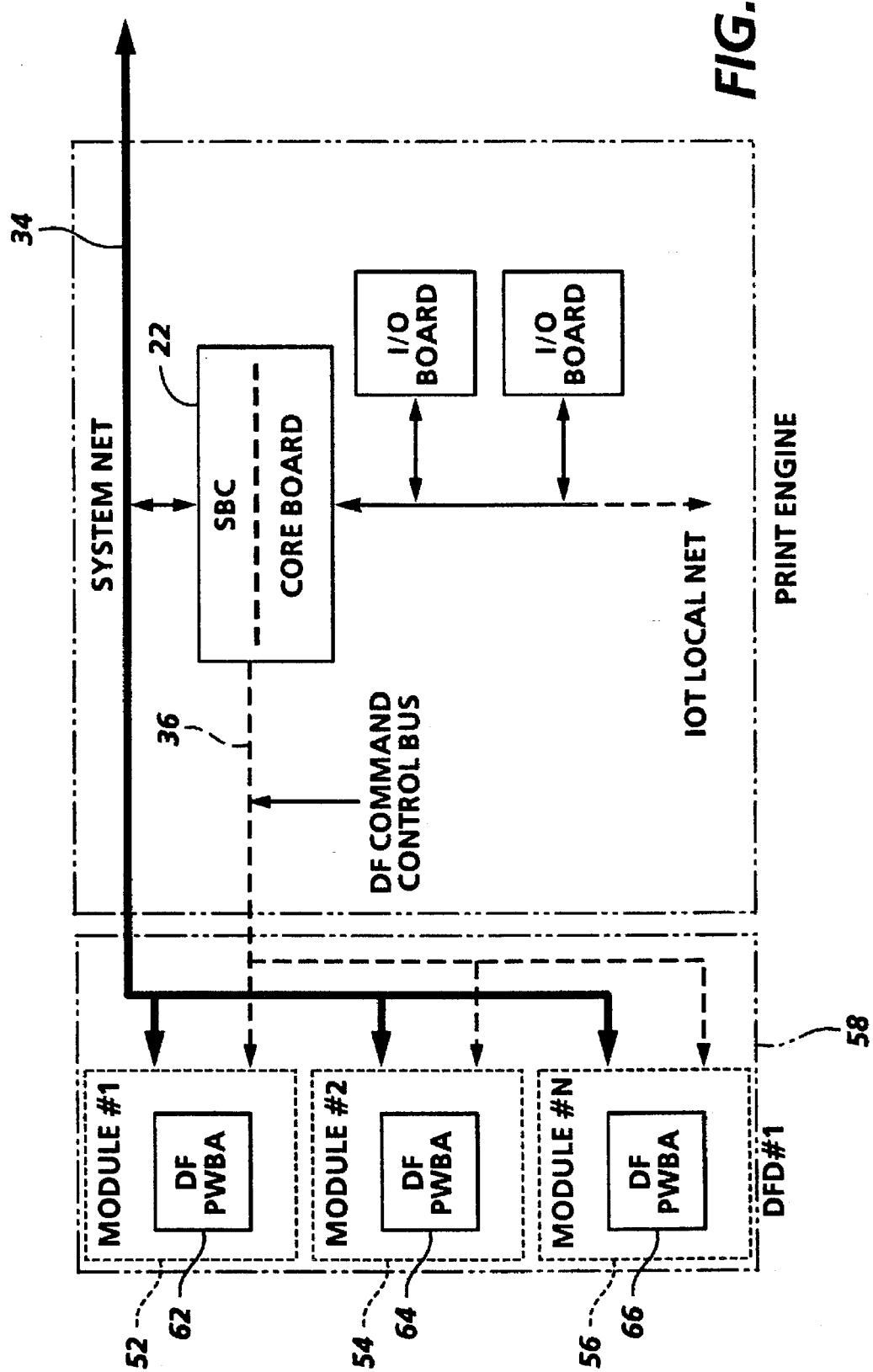
FIG. 6 illustrates another embodiment of a control architecture in accordance with the present invention.

In another embodiment, shown in FIG. 6, document finishing and/or feeding functionality are built up with individual modules 52, 54, and 56 that are inserted into a module base frame 58. These modules include stacking, mail box sorting, booklet making, binding, inserting, folding, etc. Each module would contain a PWBA 62, 64, and 66 which interfaces to the System Net 34, the Command Control Bus 36, and SBC 22. The PWBA would also be responsible for controlling functions of that module. The operator can insert or remove modules depending upon the requirements for the current job.

This architecture supports a range of document feeder device functional complexity from simplistic to complicated. Simplistic is defined as no controls coupling with the print engine and complicated defined as the device functionality being fully integrated with the print engine. The support of simplistic through complicated enables devices of varying capabilities to use only those parts of the interface that are required to control the device.

Implementations in which job recovery will require no operator intervention to guarantee job integrity are also supported by this architecture. The context of job integrity in this document refers to the ability of the print engine to know that its finished output has been delivered. This architecture is capable of supporting document delivery validation. Document delivery validation refers to an independent audit of the image(s) on the finished output.

This architecture enables development of document feeder and finisher devices and implementation of the interface by third party vendors. This enables third party vendors to develop hardware/software and implement the interface for connection to various print engines. This interface will enable various feeding and/or finishing devices to be placed on different print engines.

Autoconfiguration, in accordance with the present invention, is defined as the ability of the print engine to determine the capabilities and positions of all devices that are connected to it. Autoconfiguration relieves the operator of the task of describing to the print engine the configuration and positions of each of the document feeder or finisher devices and this capability is necessary to provide a more reliable means of determining the configuration of the devices.

Figure 7:
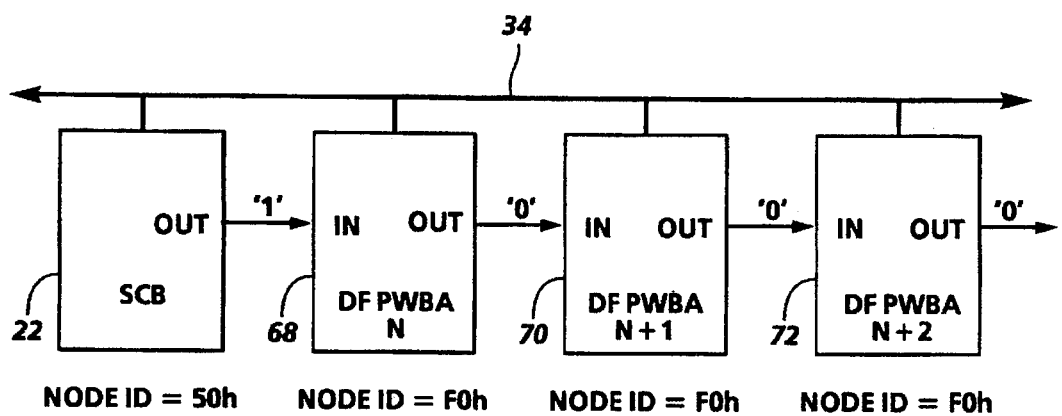

A basic feature required in order to perform autoconfiguration is the ability for the print engine to communicate with one device at a time starting with the first device and working out to device N. One embodiment utilizes one input and one output on the PWBA processor of the device. This embodiment uses the Motorola MC68302 and is shown in FIG. 7.

When a device PWBA is powered-up, it disables the autoconfiguration output signal and monitors the autoconfiguration input signal. When the autoconfiguration input is received the device PWBA is allowed to communicate with SCB 22. Then the device PWBA allows the next device PWBA in the chain to communicate with the SCB by inserting the autoconfiguration output. This continues until each device has communicated with SCB 22.

When the system is powered up, each of the nodes in the finishing chain will disable communications to the node that is after them in the chain. This is accomplished by the having the processor on the device PWBA set the device Command line for autoconfiguration low. Until this line is set, a device PWBA will ignore all communication that is taking place on the System Net. The print engine will begin the autoconfiguration process by setting the autoconfiguration line on the Command Bus for the first device. An example of this is shown in FIG. 7.

Figure 8:
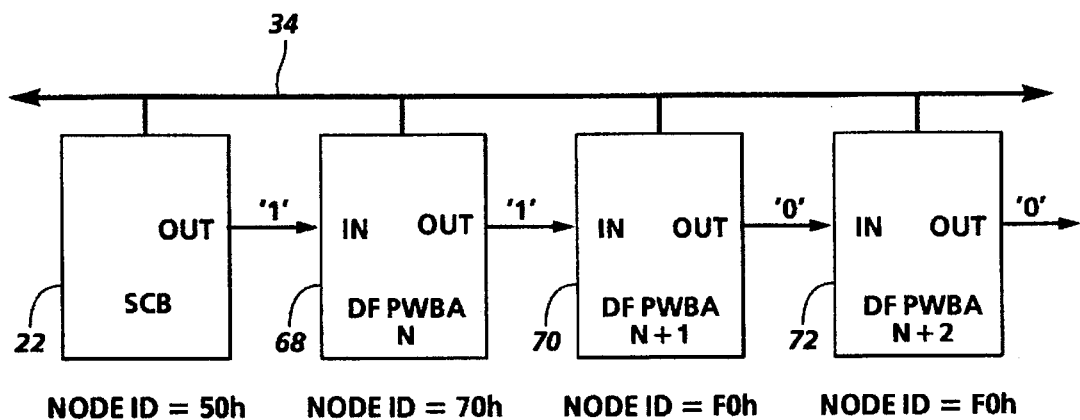

In one embodiment, SCB 22 will power up with a node ID of 50$h$. Each of the device PWBA boards in the finishing chain will initially power up with a node ID of F0$h$. When a device PWBA completes its power-up self test and has the autoconfiguation line on the device Command Bus 36 set, it will send a message to the SCB (node ID 50$h$) requesting its node ID. The SCB 22 will send a message to node ID F0$h$ requesting that it reconfigure to node ID 70$h$. Because all the nodes in the finishing chain have disabled communications on the System net 34 after them, none of the other nodes in the finishing chain can get the message and only device PWBA N receives the message. Device PWBA N then reconfigures to node ID 70$h$ and enables communications to the node after it in the finishing chain by setting the output signal. This is shown in FIG. 8

Figure 9:
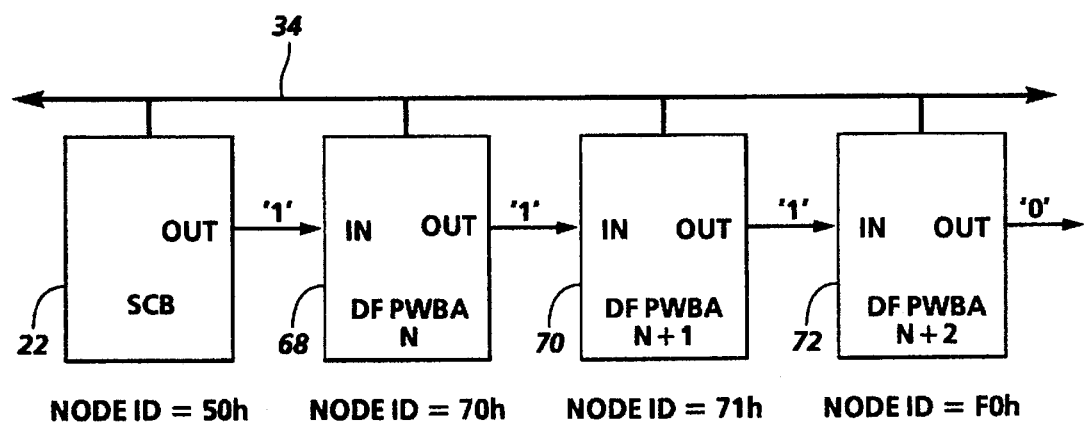
Figure 10:
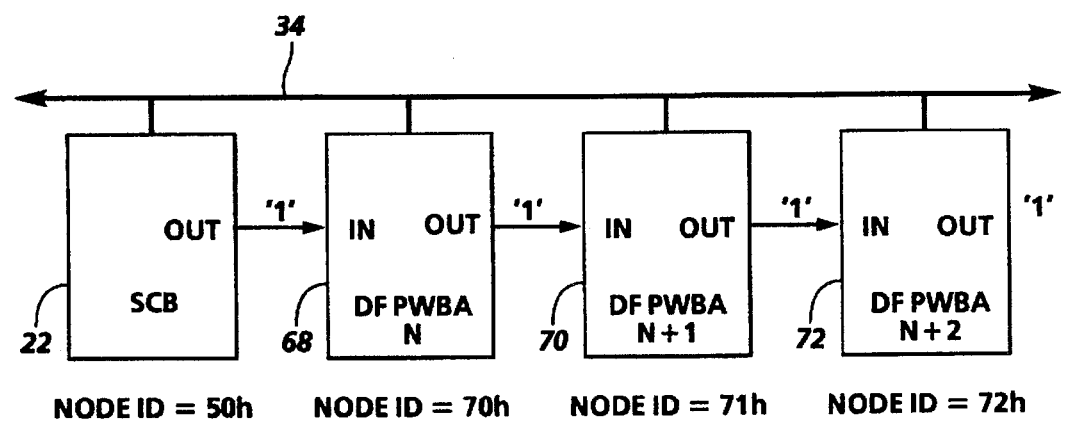

The next node in the finishing chain then sends a message to node 50$h$ (the SCB) requesting its node ID. The SCB then sends a message to node ID F0$h$ requesting that it reconfigure to node ID 71$h$. PWBA N+1 receives the message and reconfigures to node ID 71$h$. It then enables communications on the System net to nodes after it by setting the output signal. This is shown in FIG. 9.

The next node 72 in the finishing chain then sends a message to node 50$h$ (SCB 22) requesting its node ID. The SCB then sends a message to node ID F0$h$ shown as 72 requesting that it reconfigure to node ID 72$h$. Node PWBA N+2 configures to ID 72$h$ and enables communications to nodes after it by setting the output signal. The SCB waits for a message from node F0$h$ configured to node 72$h$ requesting the next consecutive finishing node ID. If no message is received within the timeout period, then the SCB assumes that there are no other nodes to be configured into the finishing chain. A timeout period has not been determined yet but should be a time that allows the nodes to complete their power-up sequence and send the ID request message to the SCB. In one embodiment, finishing nodes are assigned node IDs of 70$h$ to AFh. The extra node IDs are reserved for future expansion. The final configuration for the system that we started with would be that shown in FIG. 10.

Also attached to the SCB is the document feeding chain. Configuration of the node IDs in the document feeding chain are much like that of the finishing chain except that the nodes initially powerup with a node ID of F2$h$. SCB 22 waits for a message from node F2$h$ requesting a node ID. When a message is received, it is assigned the next consecutive feeding node ID. Node IDs for the feeding chain are from B0$h$ to EFh in one embodiment. Again, the extra node IDs are for future expansion. A typical configuration of the feeding chain after autoconfiguration is shown in FIG. 11.

With the autoconfiguration scheme that has been described, the feeding and the finishing chains will be in the process of being configured at the same time. While doing autoconfiguration, if the SCB received two messages or an unexpected message from node F0h or F2h, then the SCB knows that one of the relays in that chain has failed. In one embodiment, it is not contemplated that a device would be both a feeding and a finishing device. However, if a device can be both a feeding and a finishing device, the situation could be handled by having a switch on the device that would select which power-up ID the device would use.

It should also be noted that the system net is required to be terminated on both ends. In particular, the serial bus requires a termination resistance of 50 ohms in both the autoconfiguration and normal operating modes. Because there are document feeding devices as well as document finishing devices, there will be two 100 ohm resistors across the serial bus in parallel. This can be done by placing a termination resistor at the ends of the feeding chain and the finishing chain when the system is set up. These ends will be the ones furthest away from the print engine. FIG. 12 illustrates the placement of the resistors in a BNC cap that can be attached to the last serial interface connector.

While there has been illustrated and described what is at present considered to be a preferred embodiment of the present invention, it will be appreciated that numerous changes and modifications are likely to occur to those skilled in the art, and it is intended to cover in the appended claims all those changes and modifications which fall within the true spirit and scope of the present invention.

We claim:

1. An electronic image processing apparatus comprising a marking machine, a source of copy sheets, a controller, and a plurality of resources, each of the resources including an associated processor, each of the processors storing data related to operational timing of an associated resource, a bus for interconnecting the processors to the controller for directing the operation of the image processing apparatus to provide images on copy sheets, the controller including circuitry for interrogating each of the processors for operational timing data and logic for responding to the operational timing data of each of the processors for dynamically configuring the controller to operate in accordance with the operational timing of said processors.

2. The processing apparatus of claim 1 wherein the logic determines the timing compatibility of the resources associated with each of the processors.

3. The processing apparatus of claim 2 including a screen to display the timing relationship of the processors.

4. The processing apparatus of claim 1 wherein the resources include finishing devices.

5. The processing apparatus of claim 4 wherein the finishing devices include a stapler.

6. The processing apparatus of claim 4 wherein the finishing devices include a folder and a trimmer.

7. The processing apparatus of claim 1 wherein the resources include document feeding devices.

8. The processing apparatus of claim 1 wherein the logic for responding to the operational timing data of each of the processors for dynamically configuring the controller provides for the compatibility of the resources.

9. The processing apparatus of claim 1 wherein the bus for interconnecting the processors to the controller includes three send and receive wire pairs.

10. The processing apparatus of claim 1 wherein the bus for interconnecting the processors to the controller includes an auto configuration wire pair.

11. The processing apparatus of claim 1 wherein the bus for interconnecting the processors to the controller includes a timing data pair.

12. In an electronic image processing apparatus comprising a marking machine, a source of copy sheets, a controller, and a plurality of resources, each of the resources including an associated processor, each of the processors storing data related to operational timing of an associated resource, and a bus for interconnecting the processors to the controller for directing the operation of the image processing apparatus to provide images on copy sheets, a method of setting timing of the controller depending upon the timing of associated resources comprising the steps of:

interrogating each the processors by the controller to receive the data related to operational timing, determining compatible timing for the image processing apparatus in response to the operational timing data, and setting the timing of each of the resources in response to the determined compatible timing.

13. In an electronic image processing apparatus comprising a printer having a main processor with memory and control logic and an interconnected finishing device having a control element with memory storing operational data related to the finishing device, a method of coordinating the operation of the printer and finishing device comprising the steps of:

interrogating the control element for the operational data of the finishing device, responding to the operational data of the control element to determine compatible timing operation between the printer and the finishing device, and dynamically configuring the control element of the finishing device to operate in compatability with the printer.

14. In an electronic image processing apparatus comprising a printer having a main processor with memory and control logic and a plurality of interconnected accessory devices, each of the accessory devices having a control element with memory storing related operational data, a method of coordinating operation of the printer and accessory devices comprising the steps of:

establishing communications with the control element of a first accessory device in a chain of accessory devices, interrogating the control element of the first accessory device for operational data related to the first accessory device, establishing communications with the control element of a second accessory device in the chain of accessory devices, interrogating the control element of the second accessory device for operational data related to the second accessory device, repeating the steps of establishing communications and interrogating control elements for any additional devices in the chain, and responding to the operational data of the control elements to dynamically configure the accessory devices to operate in compatability with the printer.

15. In an electronic image processing apparatus comprising a printer having a main processor with memory and control logic, an autoconfiguration line and a plurality of interconnected accessory devices, each of the accessory devices having a control element with memory storing related operational data, the main processor and the control elements being interconnected by the autoconfiguration line, a method of coordinating the operation of the printer and accessory devices comprising the steps of:

setting the autoconfiguration line for a first control element in a chain to send a message to the main processor requesting a node ID, requesting by the main processor for the reconfiguring of the first control element, reconfiguring of the first control element upon receiving a signal from the first control element and enabling communications to a second control element in the chain, requesting by the main processor for the reconfiguring of second control element, reconfiguring of the second control element upon receiving a signal from the second control element and enabling communications to a third control element in the chain, requesting by the main processor for the reconfiguring of the third control element, and determining that there are no more devices in the chain upon failure to receive a signal from the third control element.

\* \* \* \* \*